United States Patent Office 3,201,919
Patented Aug. 24, 1965

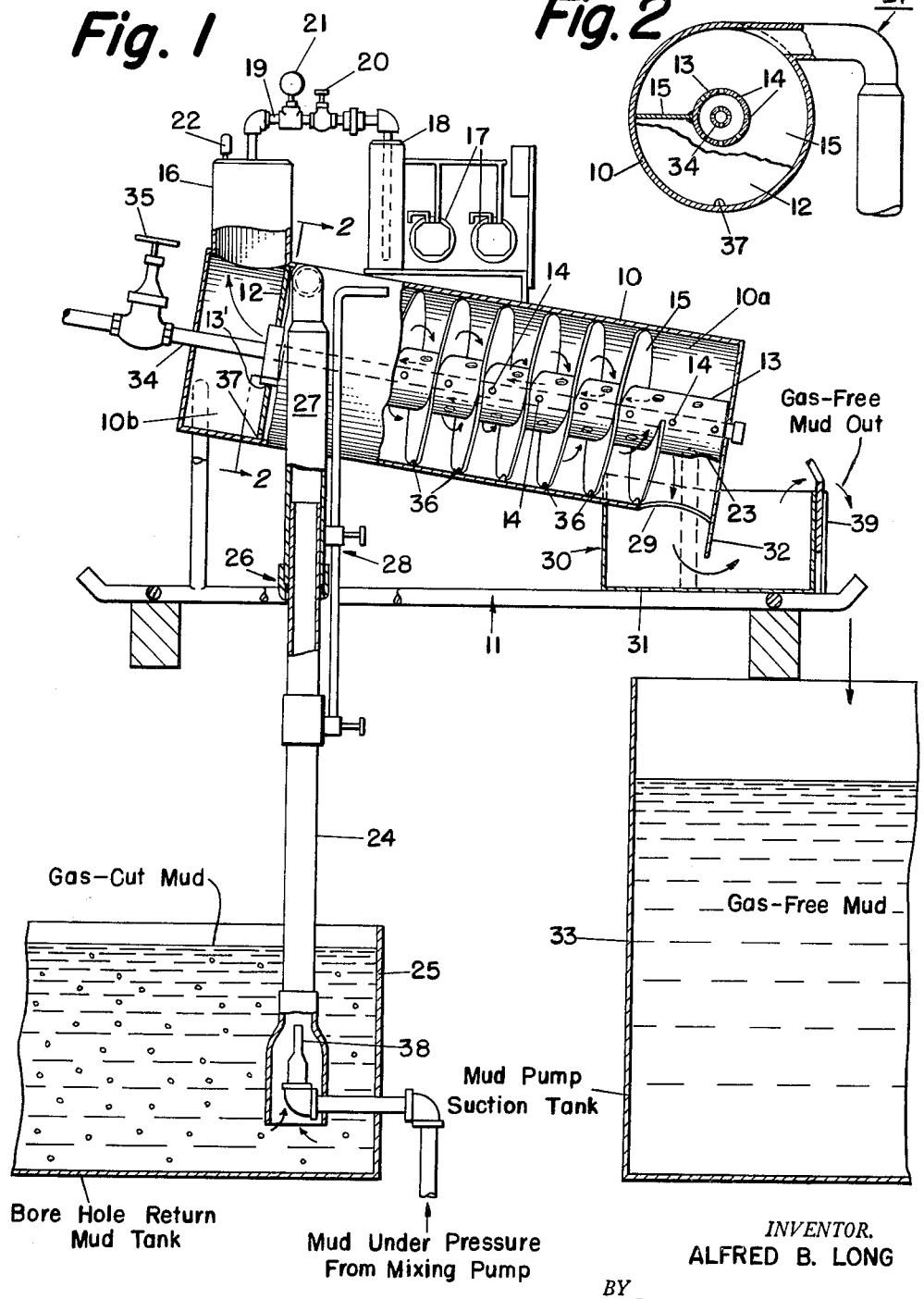

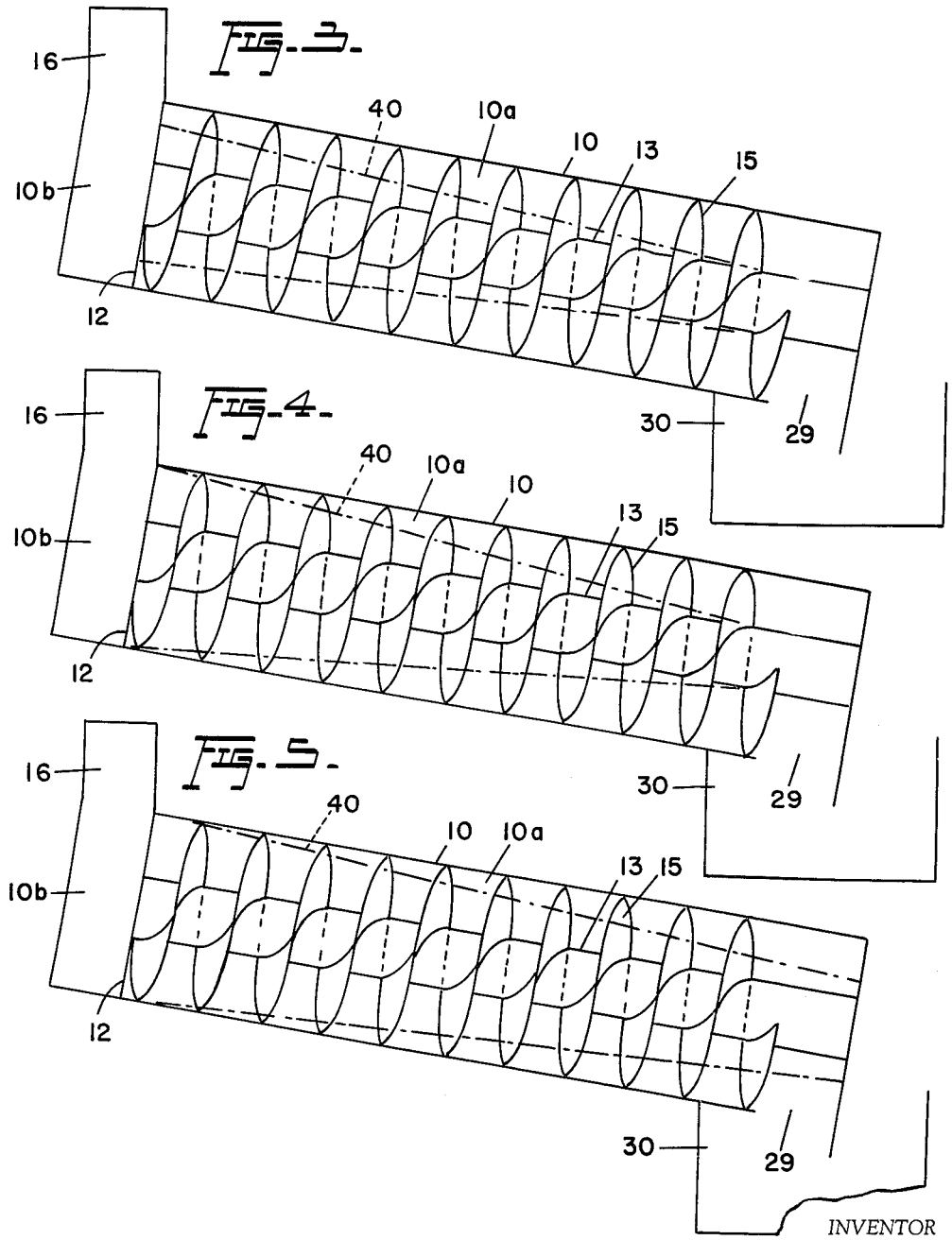

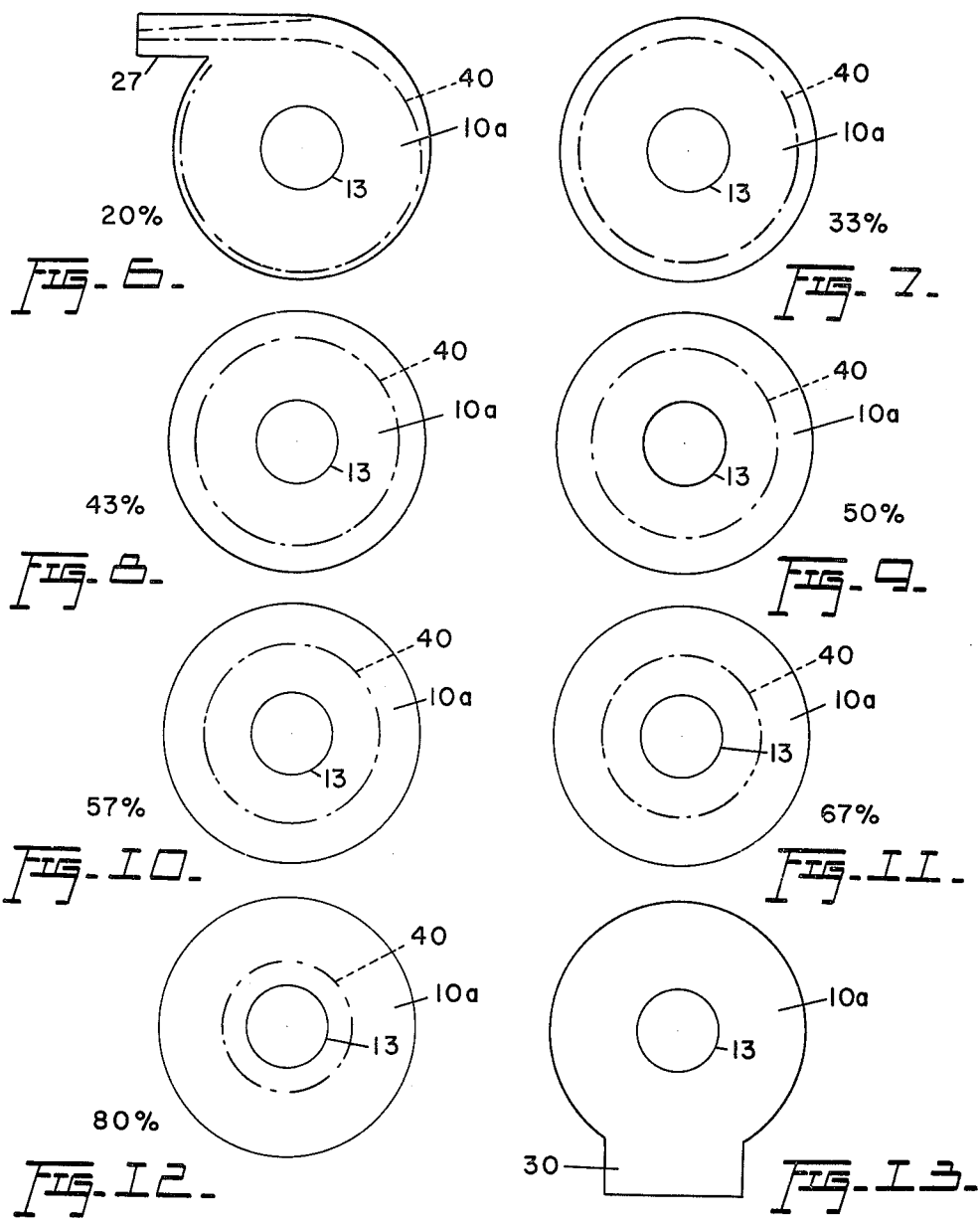

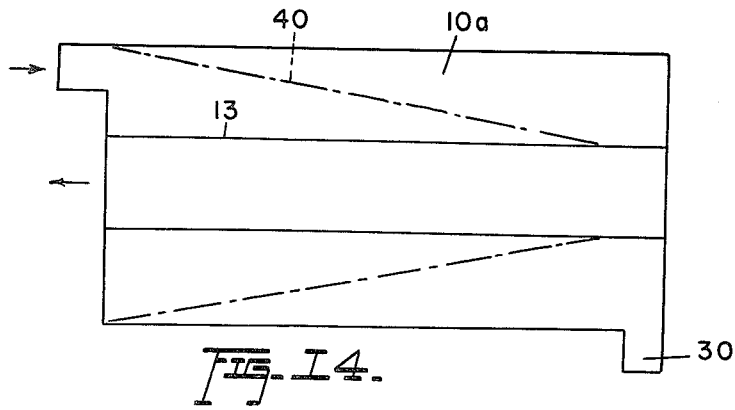
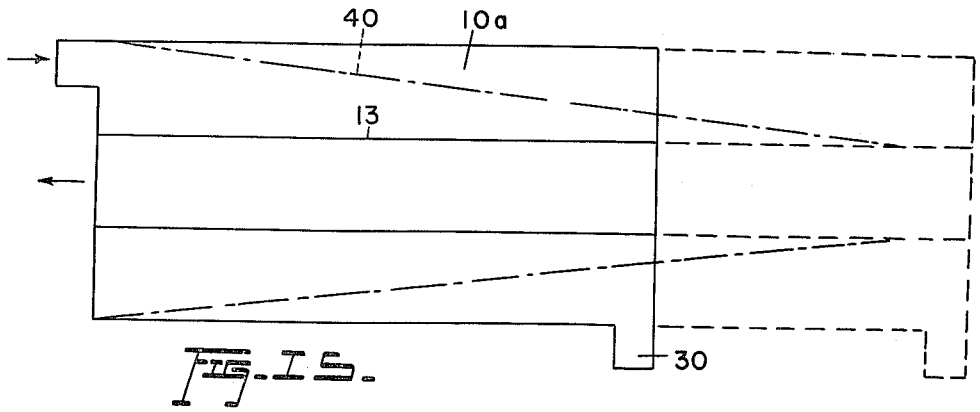
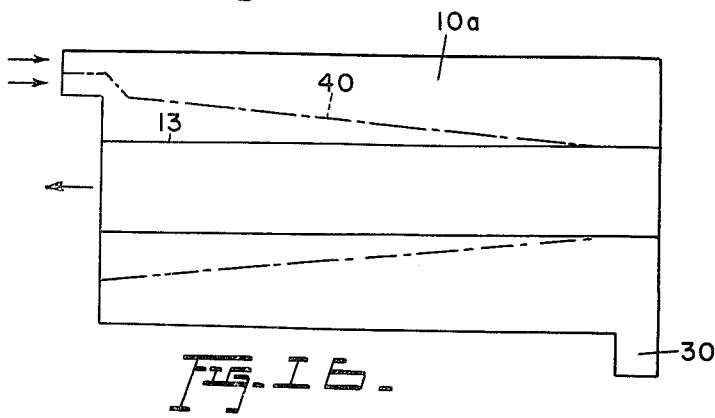

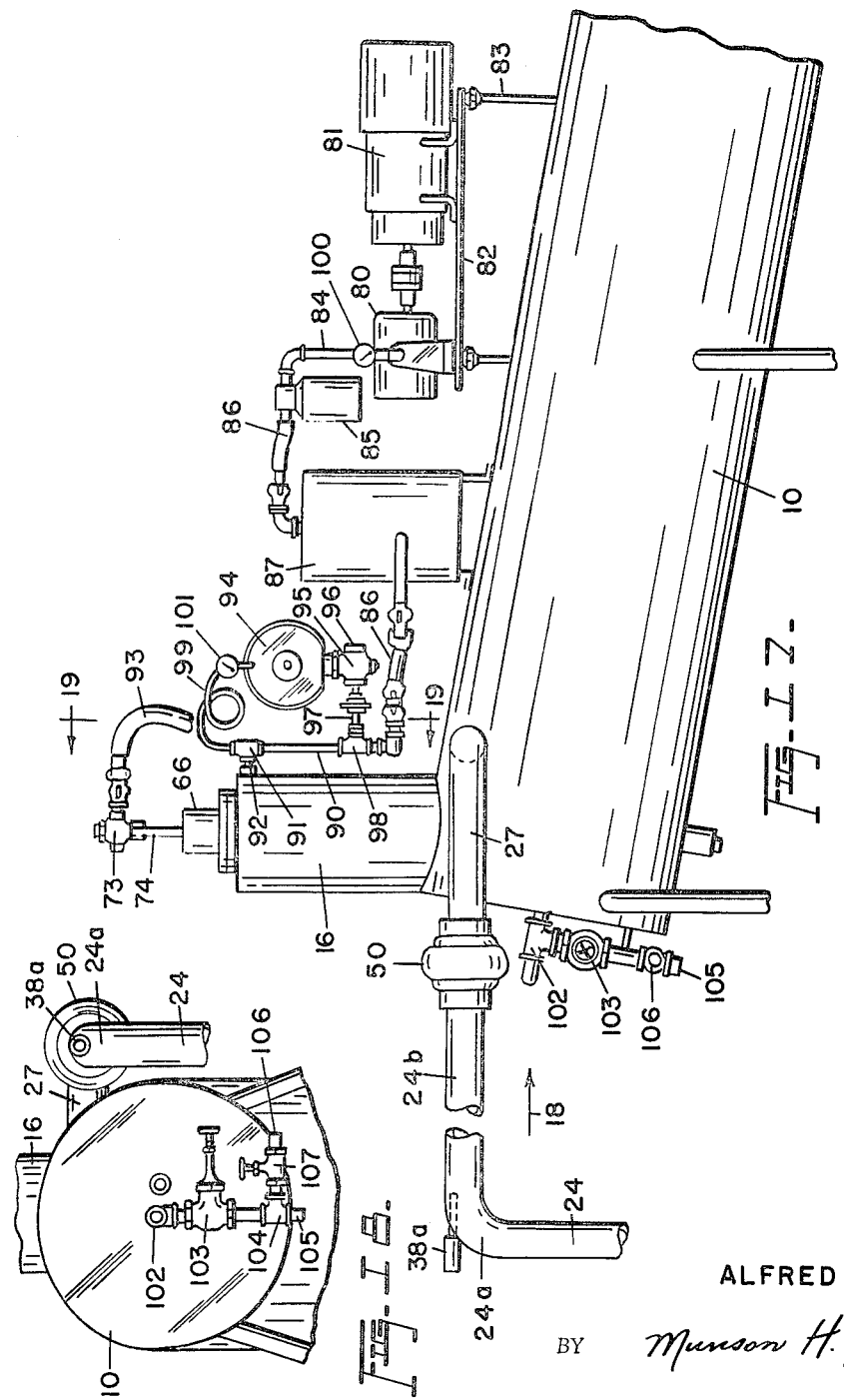

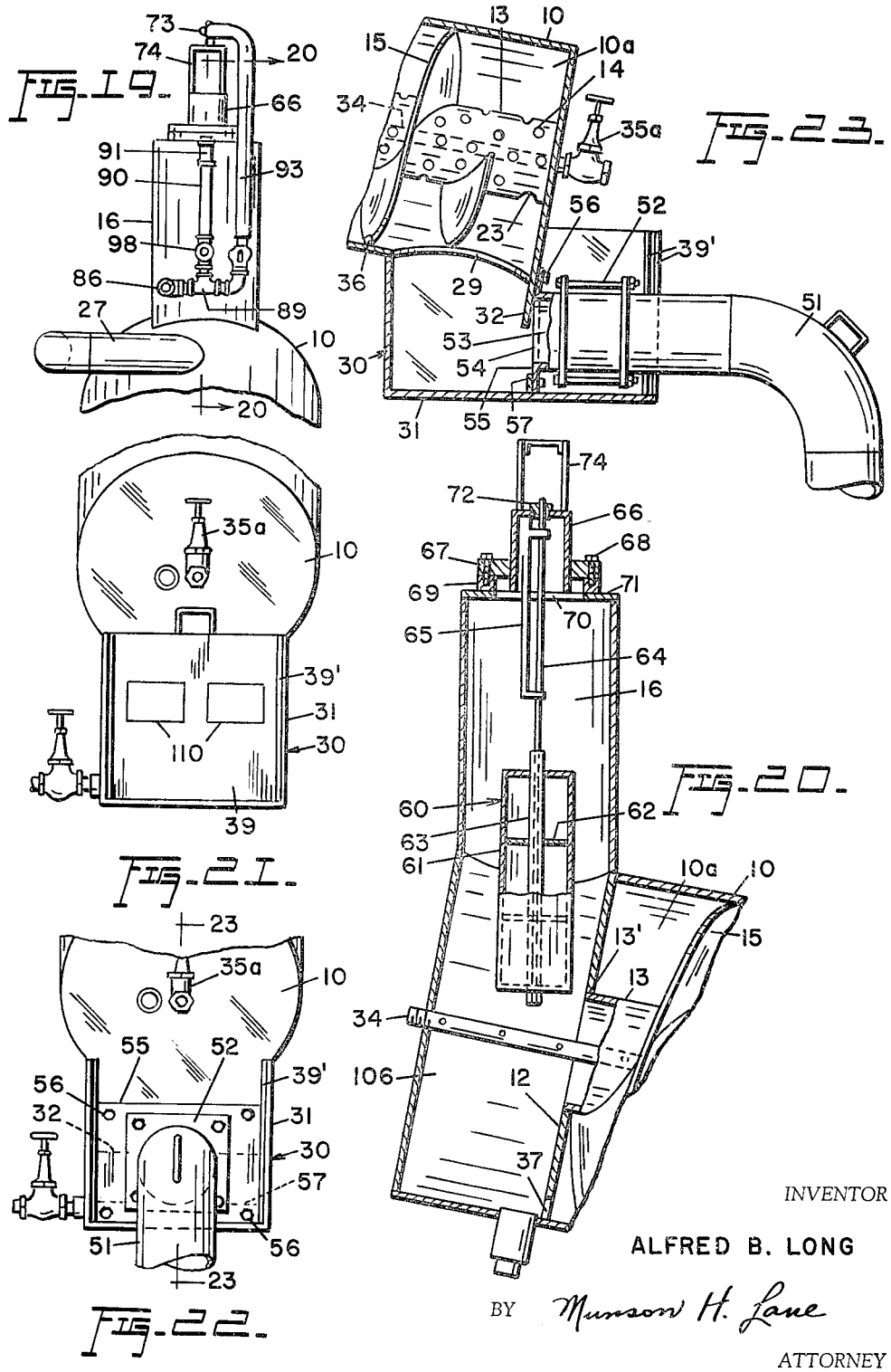

3,201,919
DRILLING MUD DEGASSER
Alfred B. Long, Beaumont, Tex., assignor to Bass Brothers Enterprises, Inc., Fort Worth, Tex., a corporation of Texas
Filed May 23, 1962, Ser. No. 203,675
25 Claims. (Cl. 55—46)

The invention relates to a drilling mud or fluid degasser, and more particularly to a method and device for degassing drilling mud or fluid as it returns to the surface during a well drilling operation.

The present application is a continuation-in-part of my earlier application Ser. No. 823,106, now abandoned, filed June 26, 1959.

While a well is being drilled, it is necessary to maintain a column of drilling fluid which will exert sufficient hydrostatic pressure throughout the well bore. This pressure must be great enough to counteract the pressure of any formation penetrated by the borehole. Gas from a gas-bearing formation will enter into the well bore if the formation pressure is greater than the pressure exerted by the drilling fluid column. When this gas comes in contact with the drilling fluid, the latter becomes entrained with formation gas, that is, it becomes "gas-cut."

Neglect in removing the entrained gas, and continued recirculation of gas-laden or gas-cut drilling fluid, will lighten the fluid column enough to allow the impact of the formation pressure to reach the surface. Very often, these pressures are excessive, and reach the surface too suddenly to be controlled. The result is usually a costly and hazardous "blow-out."

There are two general methods for maintaining the original drilling fluid hydrostatic pressure, once gas has entered the borehole from a formation. The first of these is the addition of enough high specific gravity material to the "cut" drilling fluid to attain the original mud weight. However, using this method it is difficult to avoid pumping slugs of high specific gravity material into the hole, since this material must usually be added at a rapid rate. These "slugs" frequently result in creating counter pressure, and are responsible for numerous cases of "lost circulation" and stuck drill pipe. Lost circulation entails a risk of losing the hole, particularly when drilling deep holes. Also the added material is expensive and adds to the drilling costs.

A second and more feasible method of maintaining the original hydrostatic pressure of a "cut" drilling fluid is the removal of the entrained gas, before the fluid is recirculated. This is readily, efficiently, and easily accomplished by means of a degasser.

The system as a whole is illustrated in Erwin Patents Nos. 2,748,884 and 2,869,673, the present invention residing in improvements in the degasser apparatus and the method of operating the same.

In the aforesaid Erwin patents, a closed vacuum mud degassing tank is employed for degassing gas-laden drilling mud, said degasser having an inlet conduit for gas-laden mud having an outlet conduit leading from the degasser tank and having means for causing the mud to flow into, through and out of the mud degassing tank comprising a jet nozzle which discharges de-gassed mud into the outlet conduit beyond the degasser tank. This arrangement is desirable in the Erwin system since it results in a continuous flow of mud through the system while exposed to vacuum, and contamination of the degassed mud used in the nozzle is avoided by supplying the recirculated degassed mud to the system beyond the degasser outlet.

In the Erwin system, the degasser tank is horizontally disposed and is provided with inclined baffles over which the mud flows to aid in the degassing operation.

In accordance with my invention, a closed vacuum tank is also employed in the degassing system, but instead of introducing the mud to be degassed axially in the tank as in the Erwin system, I introduce such mud into the tank tangentially so as to impart a whirling movement to the fluid, and preferably withdraw gas removed from the mud by means of a perforated tube extending axially through the center of the tank, the degassed mud being preferably removed from the tank peripherally through an opening or openings located downstream from the peripheral inlet.

Also in accordance with my invention I introduce relatively heavy gas-free mud under pressure from the conventional mixing or mud pump of the system to the inlet pipe through an inlet nozzle and also with this relatively heavy mud, to cause the lighter gas-laden mud within the tank to flow toward the center of the tank where the gas may be more readily eliminated from the whirling stream of fluid passing through the vacuum tank as will be more apparent from the further detailed description of the invention. By this expedient I am enabled to obtain more efficient degassification with a mud degassifier of a given size than could be obtained without the addition of the heavy gas-free mud, or alternatively I may obtain the same efficiency with a degassifier of less size than would otherwise be required, as will be apparent from a consideration of FIGS. 3–16, and particularly FIGS. 14–16, to be more fully described hereinafter.

An object of this invention is to provide a novel device for degassing drilling fluid or mud, together with a novel method for effecting the degassing operation.

Another object is to provide a drilling fluid degasser which is economical in construction, relatively light in weight, simple in operation, and with no moving parts in the flow path of the fluid.

Other objects and features of novelty will be apparent from the following detailed description in which specific embodiments of the invention are set forth by way of illustration rather than by limitation.

In the drawings:

FIGURE 1 is an elevational view, with parts broken away, of a drilling fluid degasser according to this invention;

FIGURE 2 is a cross-section taken on line 2—2 of FIGURE 1;

FIGURES 3, 4 and 5 are diagrammatic illustrations, taken longitudinally of the degasser and showing its operation in separating gas free mud from gas cut mud;

Figure 24:
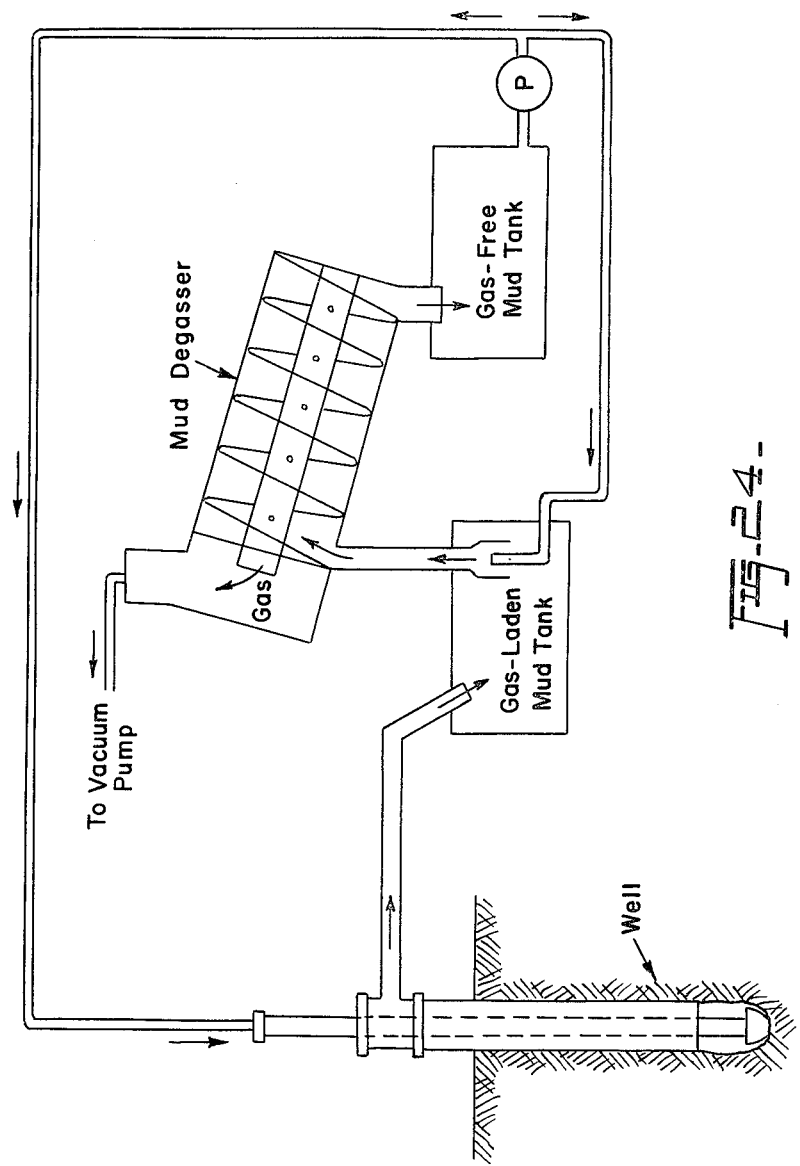

FIGURES 6–13 inclusive are diagrammatic illustrations, taken transversely of the degasser at longitudinally spaced planes, and showing the separating operation thereof;

FIGURES 14, 15 and 16 are diagrammatic illustrations related to the operating efficiency of the degasser;

FIGURE 17 is a fragmentary side elevational view of a modified embodiment of the degasser;

FIGURE 18 is a fragmentary end view thereof, taken in the direction of the arrow 18 in FIGURE 17;

FIGURE 19 is a fragmentary elevational view, taken substantially in the plane of the line 19—19 in FIGURE 17;

FIGURE 20 is an enlarged, fragmentary vertical sectional view, taken substantially in the plane of the line 20—20 in FIGURE 19;

FIGURE 21 is a fragmentary end view of the lower end portion of the degasser shown in FIGURE 17;

FIGURE 22 is a fragmentary view, similar to that shown in FIGURE 21 but illustrating a modified arrangement of the same;

FIGURE 23 is a fragmentary vertical sectional view, taken substantially in the plane of the line 23—23 in FIGURE 22; and FIGURE 24 is a diagrammatic view showing the components and operation of the apparatus as a whole.

The objects of this invention are accomplished, briefly, in the following manner: the drilling mud or fluid to be degassed is tangentially fed at a high velocity from the borehole return mud supply into a cylindrical chamber to cause the mud to travel along a helical path within the chamber. Forces created by the resulting centrifugal action move the lighter gas-cut or gas-laden fluid inward toward the axis of the chamber while the heavier uncut portion tends to flow toward the periphery of the chamber. By subjecting the axial region of the chamber to a sub-atmospheric pressure (as by means of a vacuum pump), the gas bubbles are broken and removed to the atmosphere outside of the chamber. The heavy degassed fluid then is discharged from the chamber, through a fluid seal, to the mud pump suction tank, to be recirculated in the drilling rig mud system, and a portion recirculated through the degasser.

Referring now to the drawings, the main or principal components of the degasser of this invention are contained in a closed cylindrical vacuum degasser tank 10 or chamber. The tank 10, as illustrated, is mounted with its longitudinal axis at a small angle to the horizontal rather than absolutely horizontal, to facilitate draining when the chamber is being cleaned or flushed, after use. This tank may also be operated in a vertical or inclined position. The horizontal position is particularly preferred on marine drilling rigs due to space limitations between decks. Tank 10 is supported or mounted on a cross-braced and rigid skid means, indicated generally by numerial 11. This skid means includes a pair of spaced elongated horizontal members which rest on the ground or other supporting surface, and upright members fastened to these horizontal members and also to the wall of tank 10, to support this metal tank or chamber in an elevated substantially horizontal position, with its longitudinal axis at the desired slope relative to the horizontal.

Inside tank 10, an internal transverse partition or wall 12 separates the space within the tank into a first or lower compartment 10a and a second or upper compartment 10b. Partition 12 is of disk shape and is mounted transversely to the longitudinal axis of the tank 10, near to but spaced from the left-hand or higher end of the tank. Partition 12 is sealed at its periphery to the cylindrical wall of the tank.

As will be more fully set forth hereinafter, gas-laden mud to be treated is introduced tangentially and under pressure to the upper end of the compartment 10a through inlet pipe 27 (FIGS. 1 and 2) and gas-free mud is withdrawn through a bottom peripheral opening 29 substantially removed downstream from the inlet end of the gas separating compartment 10a after having been subjected to a whirling action and to an axially and centrally disposed perforated vacuum tube 13 which now will be further described.

The elongated perforated tube 13 is mounted axially in tank chamber 10 and extends from one end of the chamber compartment 10a to the other, coaxially thereof. The lower or right-hand end of tube 13 is closed, this end abutting against and being welded to the right-hand circular end wall of tank chamber 10. The upper or left end of tube 13 is welded in a suitable opening 13′ provided in partition 12, so that the bore of this tube communicates with chamber compartment 10b. Except for this opening and a suitable bottom drain or fluid return opening 37 leading from compartment 10b, partition 12 is substantially imperforate. As previously stated, tube 13 is perforated, having a plurality of openings or apertures 14 through its wall. Only a few of the holes 14 are shown; actually, there are many small holes spread over substantially the entire surface of tube 13. Thus, there is fluid communication between compartment 10a and the bore of tube 13, and also between compartment 10b and the tube bore; as a result, fluid communication is provided between compartments 10a and 10b, via openings 14 and the bore of tube 13. A large drain hole or aperture 23 is provided in the lower or right-hand end of tube 13 for the removal of fluid therefrom.

As previously set forth, the mud to be treated is introduced peripherally at one end of the gas separating compartment 10a, is passed with a whirling movement through the compartment and is withdrawn peripherally from the opposite end thereof. If desired, suitable means may be provided in the compartment to assist in the whirling movement though this is not essential to the invention in its broadest aspect.

As shown, a helical passageway, or a spiral raceway, extends from one end of compartment 10a to the other end thereof. This raceway or passageway is provided by means of a helical vane 15 which may be edge-welded to the outside of tube 13. The axis of the helix coincides with the longitudinal axis of the tank 10, and the axial length of vane 15 is substantially equal to that of compartment 10a. The transverse dimensions of the vane 15 are such that the edges of the vane contact the inner cylindrical wall of tank chamber 10, when the device is assembled. It may be seen that the vane 15, the outside wall of tube 13, the inside wall of tank chamber 10, the partition 12 and the right-hand circular end face of tank 10, together define a helical passageway, or spiral raceway, which extends from one end to the other of chamber compartment 10a.

By way of example, to fabricate or construct the helical passageway described, the vane 15 may be first welded to the outside of the perforated tube 13. This assembly is then inserted into the cylindrical chamber 10, and the tube 13 is welded to the partition 12.

The chamber compartment 10b, which may be termed a gas compartment, communicates with an upstanding gas chamber 16 which serves in effect as an extension of or an addition to the compartment 10b. It will be recalled that the compartment 10b (and also the chamber 16, which latter opens at its lower end into compartment 10b) are in fluid communication with the axial region of compartment 10a, by way of items 13 and 14. In order to subject the gas compartment 10b and the axial region of compartment 10a to a reduced or subatmospheric pressure, a pair of electrically-operated vacuum pumps 17 are provided, having their intakes both coupled through a trap 18 (which serves to keep moisture out of the vacuum pumps) and a pipe 19 to the upper end of chamber 16, and thus also to the gas compartment 10b. The discharge of pumps 17 may be vented to the atmosphere at a safe location. For proper control and measurement of the vacuum, a valve 20 and a vacuum gauge 21 may be inserted in pipe or line 19, between the trap 18 and the chamber 16. The vacuum pumps 17 (providing valve 20 is open) cause the compartment 10b, and also at least the axial region of compartment 10a, to be subjected to a subatmospheric pressure.

As an alternative to the electrical vacuum pumps 17, a steam jet vacuum pump of conventional design (not shown) may have its intake coupled to the upper end of chamber 16, and thus also to gas compartment 10b. This may be done by coupling a valved branch line or pipe to the upper end of chamber 16, and using this branch line as the intake for the steam jet vacuum pump. The latter pump would be controlled by a steam valve in the usual manner, and the discharge of this pump would be vented to the atmosphere at a safe location.

An adjustable vacuum relief valve is indicated at 22. This valve is of conventional construction and is operatively connected to the upstanding chamber 16 and thus also to the gas compartment 10b. By manipulation of valve 22, the vacuum exerted on gas compartment 10b (and also on the axial region of compartment 10a) may be adjusted.

As previously stated, relatively light gas-cut or gas-laden mud or drilling fluid, which accumulates in the borehole return mud tank 25, is fed or injected into the top of chamber compartment 10a, tangentially and at high velocity preferably together with relatively heavy gas-free mud which has been added thereto prior to its entry into the mud degasser chamber through pipe 27, as will now be more fully described.

In order to accomplish this, a jetting arrangement is employed. As shown, the enlarged lower end of an intake pipe 24 extends below the surface of the mud in the borehole return mud tank 25. At the lower end of this pipe, and positioned centrally therein, is a pipe of small diameter having an open end pointing upwardly under pressure from the mixing pump (not shown), through which gas-free mud issues in the form of a jet at 38. The quantity of gas-free mud may be regulated by means of a suitable valve (not shown). The other end of the small-diameter pipe described is coupled to a conventional drilling rig mud mixing pump (not shown), whereby this pump supplies relatively heavy gas-free mud withdrawn from tank 33 under pressure to the mud jet 38. The action of jet 38 causes the relatively light gas-cut or gas-laden mud from tank 25 to be jetted upwardly at high velocity through pipe 24.

The intake pipe 24 is shown as adjustable as to depth in the tank 25 by means of the telescoping or slip joint with packing gland 26, wherein the lower pipe 24 telescopes inside the pipe 27 which may be welded at its upper end to chamber 10. A rod-pin locking device 28 serves to lock the pipe 24 at an adjusted depth in tank 25.

The upper end of pipe 27 discharges tangentially through the wall of chamber or tank 10, at a location between the substantially vertical front race plate or partition 12 and the adjacent end of the helical vane 15, i.e. at the left-hand or higher end of chamber compartment 10a. Thus, the gas-cut mud is jetted into the higher or left-hand end of the helical passageway in degasser tank 10.

The upper end of pipe 27 extends in such a direction, as compared to the circumference of the circular transverse cross-section of cylindrical chamber 10, that, in operation, the mud traveling through pipe 27 is injected or jetted substantially tangentially into the cylindrical tank, at high velocity. This velocity establishes, sets up, or creates a hydraulic centrifugal force on the mud. The centrifugal force, acting on the mud as it travels through compartment 10a in a helical path, causes a specific gravity separation of the mud, or in other words, a radial distribution of the mud based on relative specific gravities. The lighter, gas-cut mud moves inwardly or toward the axis of tank 10, that is, toward the periphery or outside of the vortex tube 13 while the heavier, relatively gas-free fluid tends toward the periphery of the chamber.

The entrained, pinpoint gas bubbles are concentrated into larger bubbles around the periphery of the tube 13, due to the centrifugal force set up, and to the fact that the heavy gas-free mud introduced through the jet 38 at once separates from the gas-laden mud from the mud tank 25 as the combined streams enter the vacuum tank 10 tangentially through pipe 27 as previously described. The outer layer of heavy mud entering the tank 10 forces the light gas-laden mud drawn from the tank 25 toward the center of the tank, where the gas is readily removed therefrom by the vacuum exerted axially within the chamber by means of the perforated tube 13, whereby the efficiency of the process is greatly enhanced by reason of the fact that relatively heavy gas-free mud is employed in the jet 38 as a means of forcing the gas-laden mud from the tank 25 into the mud degasser vacuum tank 10 through the tangential entering pipe 27.

As previously described, the axial region of compartment 10a (i.e., the region of this compartment adjacent to tube 13) is subjected to a subatmospheric pressure due to the action of a suitable pump as, for example, the electric-motor-driven vacuum pump 17, or to the action of a steam jet vacuum pump, if the latter is used. This means that a pressure differential is established, by such pumps, between the entrained gas bubbles in the mud (at the periphery of tube 13 or in the axial region of compartment 10a) and the vacuum chamber or gas chamber 10b. The pressure reduction (vacuum) on the gas-cut mud aids in freeing the gas therefrom. Fine pinpoint gas bubbles accumulate throughout the body of the mud, in the borehole, and are difficult to release. As previously mentioned, the enlarged gas bubbles which accumulate around the center or vortex tube 13 are broken and removed by the vacuum system. The gas removed by the vacuum pumps is discharged or vented to the atmosphere, in a safe location.

The many small holes in the vortex tube 13 tend to break the enlarged gas bubbles (which are concentrated on tube 13) by friction, in addition to the bubble-breaking effect of the pressure differential, produced as previously described.

In view of the foregoing description, it may be seen that the principle of operation utilized by the degasser of the invention is essentially a combination of hydraulic centrifugal force aided by the addition of recirculated gas-free mud, and also by pressure differential or vacuum, and friction.

In operation, the relatively light gas-entrained or gas-cut mud, jetted from the borehole return or gas-laden mud tank 25 into the left-hand or higher end of the compartment 10a through pipes 24 and 27 together with the heavier gas-free mud previously introduced into the stream through the jet 38 located at the bottom of pipe 24, is substantially completely degassed by the time the mud reaches the lower or right-hand end of this passageway. A peripheral mud discharge opening 29 is provided on the bottom of tank or chamber 10 downstream from the inlet conduit 27 and preferably immediately adjacent the lower or right-hand end of compartment 10a, through which outlet gas-free mud, including the originally introduced heavy mud from jet 38 and the initially gas-laden mud from tank 25, from which the gas has been separated, is withdrawn in such a manner as not to be contaminated with the gas-laden mud immediately surrounding the tube 13 which is still undergoing vacuum treatment.

A fluid seal, denoted generally by numeral 30, is preferably provided at the mud discharge end of the degasser. This fluid seal is somewhat similar to the trap in a soil or drain pipe and may include an open-topped box 31, the sides of which extend upwardly to a level somewhat above the discharge opening 29. The top of box 31 is divided into two portions. The left-hand portion thereof is welded to the outside wall of chamber 10, around opening 29, so that this portion of the box communicates only with the interior of chamber 10, via opening 29. The right-hand portion of box 31 is open to the atmosphere, beyond or to the right of the right-hand circular end wall of the cylindrical tank 10. A vane 32, which engages at its sides the side walls of box 31, extends downwardly toward the bottom of the box, in or near the plane of the right-hand circular end wall of tank 10. This vane 32 causes the gas-free mud discharged from opening 29 to move downwardly therefrom, toward the bottom of the box 31, before it can flow upwardly and out of the box via the open top at the right-hand side of the box. The gas-free mud discharged from the degasser as described, by way of the fluid seal 30, flows into the mud pump suction tank 33, from whence it is recirculated via the drilling rig mud system, which latter ordinarily includes a borehole mud pump (not shown), such system being well known in the art as shown in Erwin Patent No. 2,748,884 (FIG. 2).

It may be noted that the gas-free mud discharged from the degasser, before it becomes subject to atmospheric pressure, must flow up to the height of the right-hand end wall of the box 31. Therefore, the effective head of the fluid seal is the vertical distance between the discharge opening 29 and the upper edge of the right-hand end wall of box 31. This end wall as shown provided with an adjustable gate 39 of more or less conventional construction, by means of which the effective upper edge of the right-hand end wall of the box 31 can be moved vertically. For operation of the degasser, this gate 39 is adjusted to the minimum fluid seal possible for a given weight mud. This results in a maximum velocity of the mud through the degasser, which is very desirable since the centrifugal force produced is directly related to the velocity, and since the effectiveness of the degassing is directly dependent on the amount of centrifugal force set up.

In the foregoing discussion, the unexpected advantages accruing from the gas-free mud along with the gas-laden mud introduced tangentially and under pressure into the inlet end of the compartment 10a, have been pointed out and FIGS. 3–16 are diagrammatic illustrations of this feature wherein the broken lines 40 indicate an approximate division between the lighter, gas-cut mud around the vortex tube 13 and the heavier, gas-free mud at the periphery of the chamber 10a.

FIGURES 14, 15 and 16 are wholly diagrammatic in character and FIGURES 3–5 are similar to FIGURES 14, 15 and 16 but include certain details of the apparatus shown in FIGURE 1, including the spiral baffles 15 which may be omitted if desired and which consequently are not shown in FIGURES 14, 15 and 16. FIGURES 6–12 inclusive are transverse sections which may be taken at different positions along FIGURES 14, 15 and 16 and which illustrate the percentage of gas-free mud which may be taken off at various positions under a given set of conditions. The quantity of the gas-free mud recirculated may be regulated as desired by an suitable valve means in the pipe supplying mud to the nozzle 38 (FIG. 1), depending on the particular conditions met with in a particular system.

It will be apparent that the diagrammatic showing in FIGURES 3–16 serves to point out the different circumstances when the combination of gas-cut and non-gas-cut mud assist in degassing. The dash lines 40 in these figures denote the point where all the gas has been removed from the gas-cut mud. All of the space outside the lines 40 is occupied by degassed mud. All of the space inside the lines 40 is occupied with mud which is gas-cut to some degree. If dash lines 40 intersect the discharge end of the vessel, it is necessary that some gas-cut mud be discharged from the vessel. As this defeats the purpose of the degasser in that all of the gas will not be removed from the mud, it is important to prevent the dash lines 40 from intersecting a mixture of non-gas-cut mud with gas-cut mud to accomplish this result as shown in FIGURES 3 and 16. The lines 40 do not contact the outer edge of the vessel in FIGURES 3 and 16, this space being occupied by non-gas-cut mud which in turn forces gas-cut mud toward the center and forces lines 40 to intersect the control vortex tube 13 rather than the discharge end of the degasser.

FIGURES 6 through 13 show the radial distribution of gas-cut and non-gas-cut muds as they pass through the device. FIGURE 15 shows that if gas-cut and non-gas-cut mud were not mixed prior to injecting the same into the vessel, it would be necessary on some muds to physically extend the length of the vessel. Blending the two, however, permits use of the same vessel on a wide variety of muds.

As previously stated, it is desirable for proper operation to adjust the vacuum exerted on the mud, by means of the adjustable vacuum relief valve 22, this adjustment being made by an operator while observing the fluid seal 30.

It may be seen that the mud degasser of this invention comprises, basically, the following elements: a mud jetting system, a cylindrical tank which may include an internal spiral raceway or helical passageway, a fluid mud seal, and a pressure differential or vacuum system. In addition, there is provided also a means for cleaning the device by flushing it with water, which latter means will now be described. Of course, the cleaning or flushing means would be used only between degassing operations or while the rig mud system is shut down.

A small-diameter perforated water pipe 34 is shown mounted inside tube 13, coaxially therewith. Pipe 34 extends the entire length of the cylindrical tank 10 and is supported in position by being welded through suitable axial openings provided in the left-hand and right-hand circular end walls of the tank. The pipe 34 extends outside the tank 10 at least at the left-hand or higher end thereof, so that water can be fed into line 34 for flushing of cleaning the degasser. A valve 35 is installed in line 34, outside the chamber 10, for control purposes. If desired, the pipe 34 can also be extended beyond the tank 10 at the lower or right-hand end thereof as shown in FIG. 23, and a valve 35a can also be provided in this extension, to ensure complete draining of the water line after the flushing or cleaning is completed.

As stated, the flushing pipe 34 has a plurality of perforations in its wall, so that water supplied to this pipe can flow through these perforations into the tube 13, and through the holes 14 and 23 in the latter into the chamber compartments 10a and 10b, and particularly into the helical mud passageway in the former compartment. In order to aid in the cleaning action of the flushing pipe, a series of small drain notches 36 are provided in vane 15, one notch at the bottom edge of each turn of the vane 15. Also, a small drain notch 37 is provided at the bottom edge of the partition 12.

These various drain notches are sufficiently small so that they do not by-pass any appreciable quantity of the mud away from its desired helical path during degassing (due to the high tangential mud velocity utilized), yet they do assist in the proper cleaning (flushing) and draining, when such is desired. As previously stated, the slope of the longitudinal axis of chamber 10 (a small angle with respect to the horizontal) facilitates draining, during and after the flushing operation. Of course, the discharge opening 29 allows complete draining of the cylindrical tank or chamber 10, as well as flushing of the box 31 which provides for the fluid seal 30.

A specific embodiment of the invention has been described in FIGS. 1 and 2 and its operation described in connection with FIGS. 3–16 for the purpose of illustration, but it will be obvious that numerous modifications and variations may be resorted to without departing from the spirit of the invention in its broadest aspects. Also, additional elements are frequently found desirable for use in connection with the basic construction shown in FIG. 1, and certain of such additions and improvements will now be referred to.

Thus, FIGS. 17–23 illustrate certain modifications and improvements which may be employed in connection with the basic degasser 10 of FIGS. 1 and 2, the interior of which is or may be unchanged from what is shown in those figures. These additional features, which will be described in more detail by reference to FIGS. 17–23 of the drawings are:

(A) adaptation of the degasser to centrifugal pump operation;

(B) the provision of float assembly means whereby the vacuum may be automatically cut off;

(C) the provision of means for limiting or controlling the maximum degree of vacuum; and (D) the provision of sight openings in the gate 39 and the outlet box 31.

With respect to the additional feature (A), it is often unavoidable that, because of pump capacities of the rig, a centrifugal pump must be used to supply the degassed mud to the jet 38. Inasmuch as centrifugal pumps are high volume-low pressure type pumps, cetrain modifications of the degasser are desirable so that the tank can handle a higher volume of mud at lower inlet pressures as supplied by a centrifugal pump. These modifications involve the provision of a second jet 38a which is installed in a bend 24a of the mud delivery pipe 24 above the level of the gas-cut mud, the purpose of the second jet being to assist in keeping the jet 38 primed, thus assisting ultimate degassing. The jet 38a, like the jet 38, may if desired be used for supplying relatively heavy gas-free mud into the stream of gas-laden mud entering the degasser.

As will be apparent from FIG. 17, the second jet 38a is oriented in the direction of a lateral extension 24b of the pipe 24 and the extension 24b is connected by a pipe union 50 to the inlet pipe 27 which delivers the mud tangentially into the degasser tank 10. The aforementioned modifications also involve the provision of means for creating an additional pressure differential between the mud entrance and exit of the tank. Since the liquid entering the tank is a mixture of gas-cut and gas-free mud and the liquid discharged from the tank is all gas-free mud, a barometric column in favor of the discharge mud has to be created, which is accomplished by the provision of an extension of the degasser tank in the form of a downwardly directed barometric pipe 51 communicating with outlet box 31, as shown in FIGURES 22 and 23. The provision of this pipe requires mud in the outlet box 31 to be excluded from atmospheric pressure and consequently, the gate 39 as used in the embodiment of FIGS. 1 and 21 is removed from its guides 39' in the box 31 and the barometric pipe 51 is connected by a suitable coupling 52 to a collar 53 which is secured at the edge of an opening 54 formed in a plate 55, as is illustrated in FIGS. 22 and 23. The plate 55 extends transversely of the box 31 and is removably attached by the bolts 56 to the adjacent end of the tank 10 (or to the vane 32) and to a rail or flange 57 provided on the bottom of the box.

In this manner the gas-free mud leaving the tank 10 through the outlet 29 passes through the box 31 directly into the barometric pipe 51 without being subjected to atmospheric pressure during its passage through the box. A barometric column in favor of the mud being discharged from the tank is thus established and the additional pressure differential between the mud entrance and exit of the tank enables the device to handle, at lower entrance feed pressures of a centrifugal pump, the total volume of gas-cut mud from the well bore.

With respect to the additional feature (B), it may be noted that if the tube 13 should become full of liquid, the degassing efficiency of the device would be greatly reduced. In order to prevent this occurrence, a float assembly designated generally by the reference numeral 60 is provided in the chamber 10b and its extension 16, as shown in FIG. 20. The float assembly 60 consists of a cylindrical, hollow float member 61 having closed ends and provided with a plurality of intermediate stiffening partitions 62, the ends of the float member and the partitions being secured to an axial tube 63 which, in turn, is secured to the lower end portion of a vertically slidable rod 64. The latter is slidably supported by a guide 65 which is suitable secured in a dome 66 at the top of the chamber 16. The dome 66 has a screw-threaded lower end portion supported in an internally threaded annulus 67 which is secured by bolts 68 to a spacer ring 69 provided at the edge of an opening 70 formed in the top wall 71 of the chamber 16. The float rod 64 extends slidably through a bushing 72 at the top of the dome 66 and operates a suitable valve 73 which communicates the chamber 16 with the atmosphere when liquid in the chamber 10b rises to a predetermined level.

The valve 73 is mounted above the dome 66 by a suitable bracket 74. Since the interior of the tank is subjected to subatmospheric pressure, it is entirely possible for a certain amount of mud to be drawn from the chamber 10a into the chamber 10b along with the gas being removed. Although drainage for such mud from the chamber 10b is facilitated by the drain opening 37, under certain conditions this drain may not be adequate and consequently, accumulation of mud in the chamber 10b will result. When this accumulated mud reaches a sufficiently high level to raise the float 61, the valve 73 will communicate the chamber 16 with the atmosphere and flooding of the tube 13 will thus be prevented.

Before proceeding to described the aforementioned feature (C), the vacuum producing accessories of the tank shown in FIGS. 17 and 19 may be noted in that they include a rotary vacuum pump 80 driven by a motor 81, both the pump and the motor being mounted on a platform 82 supported by legs 83 on top of the tank. The pump 80 is connected by a line 84 to a pump muffler 85 and the latter is connected by a line 86 to a suitable vapor trap 87. A line 88 extends from the trap 87 to a T 89 (see FIG. 19) which is provided at the lower end of a pipe 90 disposed adjacent the chamber 16. The upper end of the pipe 90 is provided with a T 91, one arm of which communicates with the chamber 16 through the medium of a nipple 92. The lower T 89 is connected by a line 93 to the aforementioned vacuum relief valve 73, the venting of the valve 73 to the atmosphere being effected through the line 93 and a vacuum regulator 94 now to be described.

The aforementioned feature (C) which comprises the means for limiting or controlling the maximum degree of vacuum in the degasser tank consists of the vacuum regulator 94 which may be in the form of a conventional diaphragm-operated vacuum breaker, mounted on a valve 95 which opens to the atmosphere at one side thereof as at 96, while its other side is connected by a line 97 to a T 98 provided intermediate the ends of the pipe 90, that is, between the T's 89 and 91 (see FIGS. 17 and 19). Suction is applied to the diaphragm of the regulator 94 through a line 99 connected to the upper T 91 and when the vacuum in the chambers 10b, 16 reaches a predetermined maximum, it is communicated through the line 99 to the diaphragm of the regulator 94 which, in turn, causes opening of the valve 95 to the atmosphere and a consequent reduction of the vacuum in the tank so that degassed mud may flow outwardly from the tank, essentially under gravity, without the outward mud flow being impaired by excessive vacuum conditions inside the tank. Suitable gauges 100 and 101 may be provided on the lines 84 and 99, respectively, to indicate the degree of vacuum existing therein. The vacuum regulator 94, of course, is used in substitution for the vacuum relief valve 22 in the embodiment of FIGURE 1.

The end of the flushing pipe 34 which projects outwardly from the chamber 10b may be connected by a fitting 102 to a shut off valve 103 which, in turn, is coupled to a T 104 (see FIG. 18), having a high pressure water connection 105 and a low pressure water connection 106, the latter being controlled by a valve 107.

The aforementioned feature (D) involves the provision of windows 110 in the gate 39 of the mud outlet box 31. In an oil field operation it is sometimes difficult for field personnel to learn operation of the equipment so as to readily determine whether or not it is operating properly. Since the back pressure on the mud created by the gate 39 in the outlet box 31 is critical to efficient operation, the sight openings or windows 110 will permit the mud in the outlet box to be readily observed.

Although the degasser of this invention has been illustrated as located between or astride two separate tanks (one being a borehole return mud tank and the other being a mud pump suction tank), this has been shown only by way of example. Actually, there are innumerable combinations of surface mud tank or earthen pit arrangements which might be used in a surface mud system; and in fact, it is very rare to find two drilling rigs which have exactly the same facilities and/or surface mud systems. Several possible different installations will now be described. The degasser of the invention could be mounted over a single tank having a partition therein; in this case, the mud intake would be taken from one side of the partition, and the mud discharge would be on the opposite side of the partition. In a two-tank installation, the degasser could be installed over one tank, or it could be installed across or astride the two tanks (the latter being the type of installation shown in FIGURE 11). In a three-tank installation, wherein two of the tanks are manifolded together to provide the input for the borehole pump and the mud mixing pump, the degasser could be installed over one tank, or it could be installed across or astride any two tanks.

Other modifications will be apparent to those skilled in the art and may be resorted to without departing from the invention as set forth in the accompanying claims.

I claim:

1. The method of degassing well drilling mud which comprises tangentially feeding gas-laden mud at high velocity into a cylindrical chamber substantially laterally to the longitudinal axis thereof, thereby causing said mud to traverse a helical path within said chamber, subjecting the axial region of said chamber to a subatmospheric pressure, withdrawing the gas-free mud from the chamber substantially downstream from the point of entry of the gas-laden mud, separating a portion of such gas-free mud and introducing the same under pressure together with the gas-laden mud flowing into the chamber after said gas-laden mud has been removed from the well.

2. The method of degassing well drilling mud which comprises tangentially feeding a stream of gas-laden drilling mud at high velocity into a cylindrical chamber substantially laterally to the longitudinal axis thereof, thereby causing said mud to traverse a helical path within the chamber whereby the lighter portion of the stream of mud tends toward the axial center of the chamber while the heavier portion tends toward the periphery, subjecting the axial region of the chamber to subatmospheric pressure to separate the gas from the mud, withdrawing said gas from the chamber separately from the mud, withdrawing the relatively heavy gas-free mud peripherally from the chamber at a point downstream from the point of entry of the gas-laden drilling mud, separating a portion of the relatively heavy gas-free drilling mud and introducing the same into the chamber under pressure together with the gas-laden drilling mud from the well after said gas-laden mud has been removed from the well.

3. The method of degassing well drilling mud which comprises feeding a stream of gas-laden drilling fluid at high velocity tangentially into a cylindrical chamber substantially laterally of the longitudinal axis thereof, thereby causing said fluid to traverse a helical path within the chamber whereby the lighter portion of the stream of fluid tends toward the axial center of the chamber while the heavier portion tends toward the periphery, subjecting the axial region of the chamber to subatmospheric pressure to separate the gas from the drilling fluid, withdrawing said gas axially from the chamber, withdrawing the gas-free fluid peripherally from the chamber at a point downstream from the point of entry of the gas-laden drilling fluid, separating a portion of the relatively heavy gas-free drilling fluid and introducing the same into the chamber under pressure together with the lighter gas-laden drilling fluid from the well after said gas-laden mud has been removed from the well.

4. The method of degassing well drilling mud which comprises feeding a stream of gas-laden drilling fluid at high velocity tangentially into a cylindrical chamber substantially laterally of the longitudinal axis thereof together with heavier gas-free fluid, thereby causing said fluid to traverse a helical path within the chamber whereby the lighter portion of the stream of fluid tends toward the axial center of the chamber while the heavier portion tends toward the periphery, subjecting the axial region of the chamber to subatmospheric pressure to separate the gas from the fluid while withdrawing said gas axially from the chamber separately from the fluid, and withdrawing the gas-free fluid peripherally from the chamber at a point downstream from the point of entry of the gas-laden drilling fluid, separating a portion of the gas-free drilling fluid and introducing the same into the chamber under pressure together with the gas-laden drilling fluid from the well after said gas-laden mud has been removed from the well.

5. A device for degassing well drilling mud comprising an inclined cylindrical chamber, transverse wall means dividing said chamber into two separated upper and lower compartments, the lower one comprising a degassing compartment and the upper one comprising a vacuum compartment, means for supplying fluid gas-laden drilling mud under pressure tangentially to the upper end of the degassing compartment substantially laterally to the axis thereof and for causing said mud to travel with high velocity along a helical path toward the opposite end of such compartment, means providing fluid communication between the axial region of said degassing compartment and the upper compartment, means coupled to said upper compartment for subjecting such compartment and the axial region of said lower compartment to subatmospheric pressure, drain means connecting said compartments and located at the bottom of said wall means, and means for withdrawing gas-free mud peripherally from the degassing compartment at a point downstream from the wall means.

6. The device as defined in claim 5 wherein said means for supplying gas-laden mud to said degassing compartment includes a gas-laden mud inlet conduit communicating with said degassing compartment, and a jet nozzle for discharging gas-free mud into said inlet conduit.

7. The device as defined in claim 5 wherein said means for supplying gas-laden mud to said degassing compartment includes a gas-laden mud inlet conduit communicating at one end with said degassing compartment and at the other end with a source of gas-laden mud, one jet nozzle for discharging gas-free mud into said inlet conduit at a point below the mud level in the source of gas-laden mud, and a second jet nozzle for discharging gas-free mud into said inlet conduit at a point downstream from the first mentioned nozzle and above the level of the gas-laden mud source.

8. The device as defined in claim 5 wherein said means for withdrawing gas-free mud from said degassing compartment is subjected to atmospheric pressure.

9. The device as defined in claim 7 wherein said means for withdrawing gas-free mud from said degassing compartment includes a barometric drain pipe communicating with and extending downwardly from said mud withdrawing means.

10. The device as defined in claim 5 together with valve means responsive to a predetermined maximum vacuum in said upper compartment for venting the same to the atmosphere.

11. The device as defined in claim 5 together with valve means for venting said upper compartment to the atmosphere, and a vacuum responsive regulator operatively connected to said valve means and in communication with said upper compartment, said regulator acting to automatically open said valve means to the atmosphere in the presence of a predetermined maximum vacuum in said second compartment.

12. The device as defined in claim 5 together with valve means for venting said upper compartment to the atmosphere, and means responsive to a rising level of mud in said second compartment for opening said valve means.

13. The device as defined in claim 5 wherein said means for withdrawing gas-free mud from said degassing compartment includes a gas-free mud receiving box having a vertically adjustable outlet gate, and mud inspection windows provided in said gate.

14. A device for degassing well drilling fluid comprising an inclined cylindrical chamber, transverse wall means dividing said chamber into a first and second compartment, means for supplying gas-laden drilling fluid under pressure tangentially to the first compartment substantially laterally to the longitudinal axis thereof, thereby causing said fluid to travel with high velocity along a helical path toward the opposite end of such compartment, means providing fluid communication between the axial region of said first compartment and the second compartment, means coupled to said second compartment for subjecting such compartment and the axial region of said first compartment to subatmospheric pressure, drain means connecting said compartments and located at the bottom of said transverse wall means, and means for withdrawing gas-free mud peripherally from the degassing compartment at a point downstream from the wall means and downstream from the point of entry of gas-laden mud to the first compartment.

15. A device for degassing well drilling fluid comprising an elongated inclined cylindrical chamber divided into first and second compartments, means for supplying gas-laden drilling fluid tangentially to one end of the first compartment under pressure and substantially laterally of the longitudinal axis of said chamber, thereby causing said fluid to travel with high velocity along a helical path toward the opposite end of said first compartment, means providing fluid communication between the axial regions of said compartments, and means coupled to said second compartment for subjecting such compartment and the axial region of said first compartment to a subatmospheric pressure, means for withdrawing mud from which the gas has been removed from said first compartment at a point downstream from the point of entry of the gas-laden mud, said supplying means including an inlet conduit for gas-laden drilling fluid from the well coupled to said one end of said first compartment, a jet nozzle for discharging gas-free drilling fluid into said inlet conduit, and a connection for supplying gas-free drilling fluid under pressure to said jet nozzle transverse wall means separating said first and second compartments, and drain means connecting said compartments located at the bottom of said transverse wall means.

16. The device as defined in claim 15 wherein said supplying means also include a second jet nozzle for discharging drilling fluid into said inlet conduit at a point downstream from the first mentioned jet nozzle, whereby to assist in maintaining the first jet nozzle primed.

17. The device as defined in claim 15 together with means for withdrawing gas-free mud peripherally from said first compartment at a point downstream from said supplying means, said means for withdrawing gas-free mud being open to the atmosphere.

18. The device as defined in claim 15 together with means for withdrawing gas-free mud peripherally from said first compartment at a point downwstrem from said supplying means, and a barometric drain pipe communicating with and extending downwardly from said mud withdrawing means.

19. The device as defined in claim 15 wherein said supplying means also include a second jet nozzle for discharging drilling fluid into said inlet conduit at a point downstream from the first mentioned jet nozzle, whereby to assist in maintaining the first jet nozzle primed, and means for withdrawing gas-free mud peripherally from said first compartment at a point downstream from said supplying means, and a barometric drain pipe communicating with and extending downwardly from said mud withdrawing means.

20. The device as defined in claim 15 wherein said means for subjecting said second compartment to subatmospheric pressure includes a means responsive to a predetermined maximum vacuum in said second compartment for venting the same to the atmosphere.

21. The device as defined in claim 15 wherein said means for subjecting said second compartment to subatmospheric pressure include valve means for venting said second compartment to the atmosphere, and a maximum vacuum regulator operatively connected to said valve means and in communication with said second compartment, whereby said valve means may be automatically opened to the atmosphere in the presence of a predetermined maximum vacuum in said second compartment.

22. The device as defined in claim 15 wherein said means for subjecting said second compartment to subatmospheric pressure include valve means for venting said second compartment to the atmosphere, and means responsive to a rising level of mud in said second compartment for opening said valve means.

23. The device as defined in claim 15 together with means for withdrawing gas-free mud peripherally from the first compartment at a point downstream from said drilling fluid supplying means, said means for withdrawing gas-free mud from the first compartment including a gas-free mud receiving box having a vertically adjustable outlet gate, and mud inspection windows provided in said gate.

24. In combination with a drilling well including a bore hole having a drilling bit working therein, a first storage tank for gas-laden mud having a pipe connection to said bore hole for receiving gas-laden mud therefrom, a second mud storage tank for gas-free mud having a return pipe for gas-free mud leading to the well bore hole, said return pipe having a mud pump therein having a low pressure side toward said second storage tank and a high pressure side toward the well, said pump being adapted to draw gas-free mud from said second mud storage tank and return it under pressure to said well bore; a mud degasser interposed between said first and second storage tanks, and comprising an elongated cylindrical degasser chamber divided into two compartments, an elongated perforated tube axially mounted in said chamber and communicating with both compartments, a helical vane in the first compartment mounted around the outside of said tube coaxially thereof, said vane defining with the outer wall of said tube and with the inner cylindrical wall of said chamber a helical passageway which extends between the ends of said first compartment, means communicating with said first storage tank for feeding said gas-laden drilling mud at high velocity tangentially into the first compartment of said cylinder substantially laterally to the longitudinal axis thereof, means coupled to said second compartment for subjecting such compartment and the axial region of said first compartment to a subatmospheric pressure, means for withdrawing mud from which the gas has been removed from said first compartment at a point downstream from the point entry, said mud feeding means including an inlet conduit for gas-laden drilling mud from the well leading to said one end of said first compartment, jet nozzle means discharging gas-free drilling mud into said inlet conduit, and means, connected to said gas-free mud return pipe at the high pressure side of said mud pump, for supplying gas-free drilling mud under pressure to said jet nozzle.

25. In combination with a drilling well including a bore hole having a drilling bit working therein, a first storage tank for gas-laden mud having a pipe connection to said bore hole for receiving gas-laden mud therefrom, a second mud storage tank for gas-free mud having a return pipe for gas-free mud leading to the well bore hole, said return pipe having a mud pump therein having a low pressure side toward said second storage tank and a high pressure side toward said well, said mud pump being adapted to withdraw gas-free mud from said second mud storage tank and return it under pressure to said well bore; a mud degasser interposed between said first and second mud storage tanks, and comprising an elongated cylindrical degasser chamber, means for supplying gas-laden drilling mud tangentially under pressure to said chamber substantially laterally to the longitudinal axis of the chamber, thereby causing said mud to travel along a helical path about the longitudinal axis of said chamber, said means, including an inlet conduit, leading from said first storage tank, for supplying gas-laden drilling mud from the well to said chamber, means for withdrawing gas-free drilling mud from said chamber at a point substantially downstream from the inlet conduit, and means including a jet nozzle, communicating with said gas-free mud return pipe at the high pressure side of the mud pump for discharging gas-free drilling mud under pressure into said inlet conduit leading to said degasser chamber, and means for subjecting the axial region of said degasser chamber to subatmospheric pressure.

References Cited by the Examiner

UNITED STATES PATENTS

| | | | |
|---|---|---|---|
| 2,228,401 | 1/41 | Pressler | 55—205 |
| 2,285,697 | 6/42 | Durdin | 55—195 |
| 2,316,729 | 4/43 | Tryon | 55—421 X |
| 2,493,095 | 1/50 | Williams | 55—187 |
| 2,705,053 | 3/55 | Morris | 210—512 |
| 2,748,884 | 6/56 | Erwin | 55—193 |
| 2,806,599 | 9/57 | Patrick. | |
| 2,849,930 | 9/58 | Freeman et al. | 55—177 |
| 2,852,091 | 9/58 | Boudreaux et al. | 55—177 |
| 2,869,673 | 1/59 | Erwin | 55—192 |
| 2,923,151 | 2/60 | Engle et al. | 55—199 X |
| 2,928,546 | 3/60 | Church | 210—512 |
| 2,941,783 | 6/60 | Stinson | 210—512 X |
| 3,042,502 | 7/62 | McGauley | 210—512 |
| 3,070,291 | 12/62 | Bergey | 210—512 |

FOREIGN PATENTS 478,679  11/51  Canada.

OTHER REFERENCES

Lapple C. E. Fluid & Particle Dynamics, Newark, Delaware, University of Delaware, 1951, p. 308.

Graham Degassers in Petroleum Engineer 13 (29), p. B-81 to B-82, December 1957, TN 860 P4.

REUBEN FRIEDMAN, *Primary Examiner.*

GEORGE D. MITCHELL, HARRY B. THORNTON, *Examiners.*